(12) United States Patent
Milne et al.

(10) Patent No.: US 8,135,888 B2
(45) Date of Patent: Mar. 13, 2012

(54) TRANSLATION MODULE TO FACILITATE CONTROL OF TV USING HOME NETWORK CONTROLLER

(75) Inventors: James R. Milne, Ramona, CA (US); Arturo Jordan, San Diego, CA (US); Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 427 days.

(21) Appl. No.: 12/401,045

(22) Filed: Mar. 10, 2009

(65) Prior Publication Data

US 2010/0231724 A1    Sep. 16, 2010

(51) Int. Cl.
  *G06F 13/12* (2006.01)
  *G06F 13/38* (2006.01)
(52) U.S. Cl. ............... 710/62; 710/105; 710/313
(58) Field of Classification Search .............. None
  See application file for complete search history.

(56) References Cited

U.S. PATENT DOCUMENTS

| 7,375,673 | B2 | 5/2008 | Spilo |
| 7,840,694 | B2* | 11/2010 | Yamaki .................... 709/232 |
| 7,899,950 | B2* | 3/2011 | Lorenzo et al. ............. 710/18 |
| 2004/0215816 | A1 | 10/2004 | Hayes et al. |
| 2005/0232159 | A1* | 10/2005 | Joo et al. .................. 370/241 |
| 2008/0126593 | A1 | 5/2008 | Wang et al. |

OTHER PUBLICATIONS

Crestron, "CN-TVAV-TV/AV Control Module", http://www.crestron.com/products/show_products.asp?jump=1&model=CN-TVAV.

* cited by examiner

*Primary Examiner* — Elias Mamo
(74) *Attorney, Agent, or Firm* — John L. Rogitz

(57) ABSTRACT

A module interconnects a home network controller and a TV and translates signals from the controller into a non-infrared (IR) protocol understandable by the TV. The module is also useful to send software updates to the TV, and/or to query the TV for diagnostic information.

7 Claims, 1 Drawing Sheet

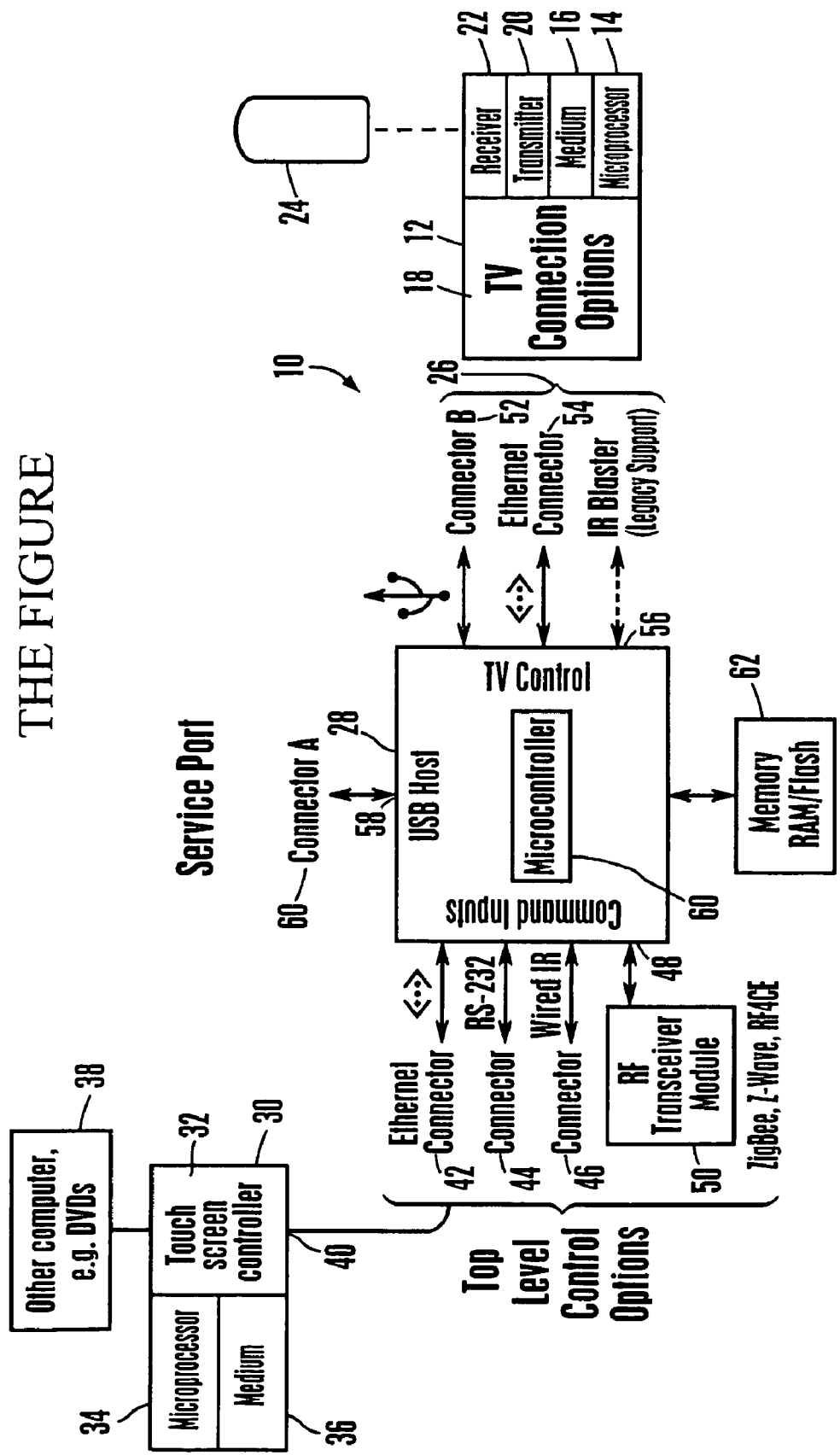
THE FIGURE

US 8,135,888 B2

TRANSLATION MODULE TO FACILITATE CONTROL OF TV USING HOME NETWORK CONTROLLER

FIELD OF THE INVENTION

The present invention relates generally to translation modules to facilitate control of a TV using a home network controller.

BACKGROUND OF THIS INVENTION

It is desirable for custom installers of home entertainment systems to provide system-wide interfaces so that a user can easily and conveniently control system components using a single interface. For example, a system-wide control interface might be a touch-screen LCD controller that is capable of operating all components in a home theater such as lighting, curtains, TV, video disk player, audio video (AV) receiver, etc. Typically, however, each component may be designed with its own unique communication interface, e.g., infrared (IR) for a TV, RS-232 interfaces for other components, radiofrequency (RF) interfaces for yet other components, and so on.

Accordingly, a custom installer must use any and all of these interfaces to control a system or systems of disparate components within the home entertainment system. To control IR devices like a TV, add-on transmitters such as so-called "IR blasters" have been provided which are taped to the front of the TV and other components, an inelegant solution at best, since something has to be taped to the TV or other components with a wire visibly leading elsewhere. Also IR blasters are strictly a unidirectional communication scheme only. Communication electronic control (CEC)-enabled components alleviate some of the difficulties implicated by heterogeneity within the system but not all components are CEC-enabled.

SUMMARY OF THE INVENTION

Accordingly, an interface module includes plural controller-side ports to one of which a home network controller may be connected, and plural TV-side ports to one of which a TV may be connected. If signals are received in a first protocol from a controller connected to one of the controller-side ports and the TV is connected to one of the TV-side ports requiring a second protocol different from the first protocol, the module translates the signals from the first protocol to the second protocol. The controller-side ports may include an Ethernet port, an RS-232 port, and a wired IR port (referring to a port receiving IR codes as electrical signals as opposed to optical signals). The controller-side ports may also include a radiofrequency (RF) transceiver module port that may be connected to a RF transceiver module, with a module output port of the controller being connectable to whichever of the controller-side ports matches the output port. Also, the TV-side ports may include a universal serial bus (USB) port and an Ethernet port, with a TV input port being connectable to whichever TV-side port matches the input port such that information is exchanged between the TV and controller through the module when the TV and controller are connected to the module.

An IR transmitter may be provided in some implementations to establish a TV-side port. Without limitation the RF transceiver port may receive input from a ZigBee® module, a Z-wave® module, or a radiofrequency for consumer electronics module.

In example implementations, should the controller employ an Ethernet protocol and correspondingly be connectable to the controller-side Ethernet port of the module, and the TV employ a USB protocol and correspondingly be connected to the TV-side USB port, the module translates Ethernet protocol commands from the controller to USB protocol commands that are conveyed to the TV. If both the controller and TV use Ethernet protocols, no translation is undertaken by the module. Signals from the TV back to the controller likewise are reverse-translated by the module.

Or, when the controller employs an RS-232 protocol and correspondingly is connected to the controller-side RS-232 port of the module, and the TV employs an Ethernet protocol and correspondingly is connected to the TV-side Ethernet port, the module translates RS-232 protocol commands from the controller to Ethernet protocol commands that are conveyed to the TV. On the other hand, when the controller employs an RS-232 protocol and the TV employs a USB protocol, the module translates RS-232 protocol commands from the controller to USB protocol commands that are conveyed to the TV.

Yet again, when the controller employs a wired IR protocol and correspondingly is connected to the controller-side wired IR port of the module, and the TV employs an Ethernet protocol and correspondingly is connected to the TV-side Ethernet port, the module translates wired IR protocol commands from the controller to Ethernet protocol commands that are conveyed to the TV. When the controller employs a wired IR protocol and the TV employs a USB protocol, the module translates wired IR protocol commands from the controller to USB protocol commands that are conveyed to the TV.

And still further, when the controller employs an RF protocol and correspondingly is connected to the controller-side RF port of the module, and the TV employs an Ethernet protocol and correspondingly is connected to the TV-side Ethernet port, the module translates RF protocol commands from the controller to Ethernet protocol commands that are conveyed to the TV. When the controller employs an RF protocol and the TV employs a USB protocol, the module translates RF protocol commands from the controller to USB protocol commands that are conveyed to the TV.

In some embodiments a control port is provided on the module for connection to a source of software upgrades to upgrade the software within the TV. A TV manufacturer service center can remotely contact the module via the control port and query the TV for diagnostic information.

In another aspect, an apparatus includes a microcontroller accessing plural controller-side ports and plural TV-side ports, and a tangible computer readable storage medium accessible to the microcontroller to enable the microcontroller to translate between a first protocol used by a home network controller and a non-infrared (IR) second protocol used by a TV to afford an installer of a home network the opportunity to control the TV by means other than only IR.

In another aspect, a method includes using a module to interconnect a home network controller and a TV, and using the module to translate signals from the controller into a non-infrared (IR) protocol understandable by the TV. The method also includes using the module to send software updates to the TV, and/or to query the TV for diagnostic information.

The details of the present invention, both as to its structure and operation, can best be understood in reference to the accompanying drawing, in which like reference numerals refer to like parts, and in which:

BRIEF DESCRIPTION OF THE DRAWING

The FIGURE shows an example system using an example translation module in accordance with present principles to permit control of a TV using a home network controller.

DETAILED DESCRIPTION OF THE PREFERRED EMBODIMENT

The FIGURE shows a home network 10 that includes one or more TVs 12 (only one TV 12 shown for clarity). The TV 12 includes a TV processor 14 accessing a computer readable storage medium 16 such as but not limited to solid state storage and/or disk-based storage to present TV signals on a TV display 18, such as a flat panel LCD display or other type of matrix display or a plasma display or other suitable type of TV display. The signals are received through a TV tuner 20 that may be connected to or even contained in a set-top box, satellite receiver, terrestrial TV antenna, cable head end, etc.

The TV 12 typically includes a wireless receiver 22 such as an infrared receiver for receiving user command signals from a remote control 24. Additionally, the TV 12 includes an auxiliary input port 26 that is connectable to at least one of the below-described TV-side ports of a translation module 28.

The network 10 also includes a network controller 30 that in one non-limiting embodiment has a touch screen display 32 receiving user tactile input signals and sending the signals to a controller processor 34 accessing a computer readable medium 36 such as solid state and/or disk-based storage. A user may manipulate the controller 30 as appropriate to send control signals to other network components 38 such as but not limited to home theater systems, curtains, lights, disk players, etc., as well as to the TV 12 via the module 28 in accordance with disclosure below. To this end, the controller 30 has at least one module output port 40 connectable to at least one of the controller-side module ports described further below.

Indeed and turning now to the module 28, as shown the module 28 includes plural controller-side ports and plural TV-side ports, so that a controller 30 may be connected to whatever controller-side port matches the communication protocol used by the controller 30 and likewise the TV 12 may be connected to whatever TV-side port matches the protocol used by the TV. In the embodiment shown, the controller-side ports include an Ethernet port 42, an RS-232 port 44, a wired IR port 46, and a radiofrequency (RF) transceiver module port 48 that may be connected to a RF transceiver module 50 that may be implemented separately from or integrally with the module 28. Without limitation the RF transceiver module 50 may be a ZigBee® module, a Z-wave® module, or a radiofrequency for consumer electronics module. The module output port 40 of the controller 30 is connected to whichever of the controller-side ports 42, 44, 46, 48/50 matches the output port 40 so that the controller 30 sends and receives data through one of the controller-side ports.

The TV-side ports of the module 28 include, in the embodiment shown, a universal serial bus (USB) port 52 and an Ethernet port 54. For legacy purposes an IR transmitter 56 may also be provided to establish a TV-side port. The TV input port 26 is connected to whichever TV-side port 52, 54, 56 matches the input port 26.

Additionally, in example embodiments the module 28 may include a control port 58 such as a universal serial bus (USB) port. The control port 58 may be connected to a source 60 of software upgrades such as a USB memory device, e.g., a Sony Memory Stick®. Or, the source 60 may be the controller 30 itself, or the Internet.

In accordance with present principles, the module 28 includes a microcontroller 60 accessing a computer readable storage medium 62 such as random access memory (RAM) or flash memory to execute logic to translate control data protocol from the controller 30 via one of the controller-side ports to a protocol corresponding to the TV-side port to which the TV 12 is connected and understands. Thus, for example, if the controller 30 employs an Ethernet protocol and correspondingly is connected to the controller-side Ethernet port 42 of the module 28, and the TV employs a USB protocol but not an Ethernet protocol and correspondingly is connected to the TV-side USB port 52, the microcontroller 60 translates Ethernet protocol commands from the controller 30 to USB protocol commands that are conveyed to the TV 12. Translation between protocols such as Ethernet-to-USB and vice-versa may be in accordance with principles in the art. If both the controller 30 and TV 12 use Ethernet protocols, no translation is required.

Likewise, if the controller 30 employs an RS-232 protocol and correspondingly is connected to the controller-side RS-232 port 44 of the module 28, and the TV employs an Ethernet protocol and correspondingly is connected to the TV-side Ethernet port 54, the microcontroller 60 translates RS-232 protocol commands from the controller 30 to Ethernet protocol commands that are conveyed to the TV 12. Yet again, if the controller 30 employs an RS-232 protocol and the TV 12 employs a USB protocol, the microcontroller 60 translates RS-232 protocol commands from the controller 30 to USB protocol commands that are conveyed to the TV 12.

It may now be readily appreciated that if the controller 30 employs a wired IR protocol and correspondingly is connected to the controller-side wired IR port 46 of the module 28, and the TV employs an Ethernet protocol and correspondingly is connected to the TV-side Ethernet port 54, the microcontroller 60 translates wired IR protocol commands from the controller 30 to Ethernet protocol commands that are conveyed to the TV 12. Yet again, if the controller 30 employs a wired IR protocol and the TV 12 employs a USB protocol, the microcontroller 60 translates wired IR protocol commands from the controller 30 to USB protocol commands that are conveyed to the TV 12.

If the controller 30 employs an RF protocol and correspondingly is connected to the controller-side RF port 48 of the module 28, and the TV employs an Ethernet protocol and correspondingly is connected to the TV-side Ethernet port 54, the microcontroller 60 translates RF protocol commands from the controller 30 to Ethernet protocol commands that are conveyed to the TV 12. Yet again, if the controller 30 employs an RF protocol and the TV 12 employs a USB protocol, the microcontroller 60 translates RF protocol commands from the controller 30 to USB protocol commands that are conveyed to the TV 12.

Similarly, TV signals are converted from their native protocol to the protocol corresponding to the controller-side port to which the controller 30 is connected.

As discussed above, the module 28 may also provide a means (e.g., the control port 58 connected to the upgrade source 60) to upgrade the software within the TV 12 and/or module 28 to add functionality or capability. Using the control port 58 metadata and/or applications can be exchanged from the TV 12 to, e.g., the system controller 30 and vice versa.

As understood herein, the metadata exchange can accomplish a desired one of many purposes. For example, the module 28 can act as an agent between a remote network facility and the TV 12. A TV manufacturer service center, for instance, can remotely contact the module 28 via the control port 58 and query the TV 12 for diagnostic information pertaining to a particular customer call. The service center may download a script or widget to the module 28 via the control port 58 and then the microcontroller 60 of the module 28 can execute the software to enable the module 28 to upload all the diagnostic information stored on the storage medium 16 of the TV 12.

In another example, a network 10 installer may remotely connect to the module 28 via the control port 58 to download the latest configuration or calibration settings or upload the current configuration or calibration settings to determine if any changes are necessary.

In addition to using the control port 58 for upgrading/metadata exchange, the controller-side Ethernet port 42 may be connected to the Internet so that a remote terminal also communicating with the Internet can download updates and upload metadata such as diagnostic information.

Thus, the module 28 affords the custom installer the opportunity to control TVs by means other than just IR.

While the particular TRANSLATION MODULE TO FACILITATE CONTROL OF TV USING HOME NETWORK CONTROLLER is herein shown and described in detail, it is to be understood that the subject matter which is encompassed by the present invention is limited only by the claims.

What is claimed is:

1. An interface module comprising:
    plural controller-side ports to each one of which a home network controller is connectable;
    plural TV-side ports to each one of which a television (TV) is connectable, wherein
    if signals are received in a first protocol from a controller connected to one of the controller-side ports and the TV is connected to one of the TV-side ports requiring a second protocol different from the first protocol, the interface module translates the signals from the first protocol to the second protocol, wherein the controller-side ports include an Ethernet port, an RS-232 port, a wired infra-red (IR) port, and a radiofrequency (RF) transceiver module port that is connectable to a RF transceiver module, a module output port of the controller being connectable to whichever of the controller-side ports matches the output port, and wherein the TV-side ports include a universal serial bus (USB) port and an Ethernet port, a TV input port being connectable to whichever TV-side port matches the input port, such that information is exchanged between the TV and controller through the module when the TV and controller are connected to the module, wherein
    responsive to a determination that the controller employs an Ethernet protocol and correspondingly is connectable to the controller-side Ethernet port of the module, and the TV employs a USB protocol and correspondingly is connected to the TV-side USB port, the module translates Ethernet protocol commands from the controller to USB protocol commands that are conveyed to the TV;
    responsive to a determination that the controller employs an RS-232 protocol and correspondingly is connected to the controller-side RS-232 port of the module, and the TV employs an Ethernet protocol and correspondingly is connected to the TV-side Ethernet port, the module translates RS-232 protocol commands from the controller to Ethernet protocol commands that are conveyed to the TV;
    responsive to a determination that the controller employs an RS-232 protocol and the TV employs a USB protocol, the module translates RS-232 protocol commands from the controller to USB protocol commands that are conveyed to the TV;
    responsive to a determination that the controller employs a wired IR protocol and correspondingly is connected to the controller-side wired IR port of the module, and the TV employs an Ethernet protocol and correspondingly is connected to the TV-side Ethernet port, the module translates wired IR protocol commands from the controller to Ethernet protocol commands that are conveyed to the TV;
    responsive to a determination that the controller employs a wired IR protocol and the TV employs a USB protocol, the module translates wired IR protocol commands from the controller to USB protocol commands that are conveyed to the TV;
    responsive to a determination that the controller employs an RF protocol and correspondingly connected to the controller-side RF port of the module, and the TV employs an Ethernet protocol and correspondingly is connected to the TV-side Ethernet port, the module translates RF protocol commands from the controller to Ethernet protocol commands that are conveyed to the TV; and
    responsive to a determination that the controller employs an RF protocol and the TV employs a USB protocol, the module translating RF protocol commands from the controller to USB protocol commands that are conveyed to the TV.

2. The interface module of claim 1, comprising an IR transmitter establishing a TV-side port.

3. The interface module of claim 1, wherein the RF transceiver port receives input from a ZigBee® module, a Z-wave® module, or a radio frequency for consumer electronics module.

4. The interface module of claim 1, wherein if both the controller and TV use Ethernet protocols, no transition is undertaken by the interface module.

5. The interface module of claim 1, wherein TV signals are converted from their native protocol to a protocol corresponding a controller-side port to which the controller is connectable.

6. The interface module of claim 1, comprising a control port connectable to a source of software upgrades to upgrade the software within the TV.

7. The interface module of claim 6, wherein a TV manufacturer service center can remotely contact the interface module via the control port and query the TV for diagnostic information.

* * * * *